Feb. 26, 1929.
C. HOSLER ET AL
1,703,820
UNLOADING CONVEYER
Filed April 11, 1928
3 Sheets-Sheet 1
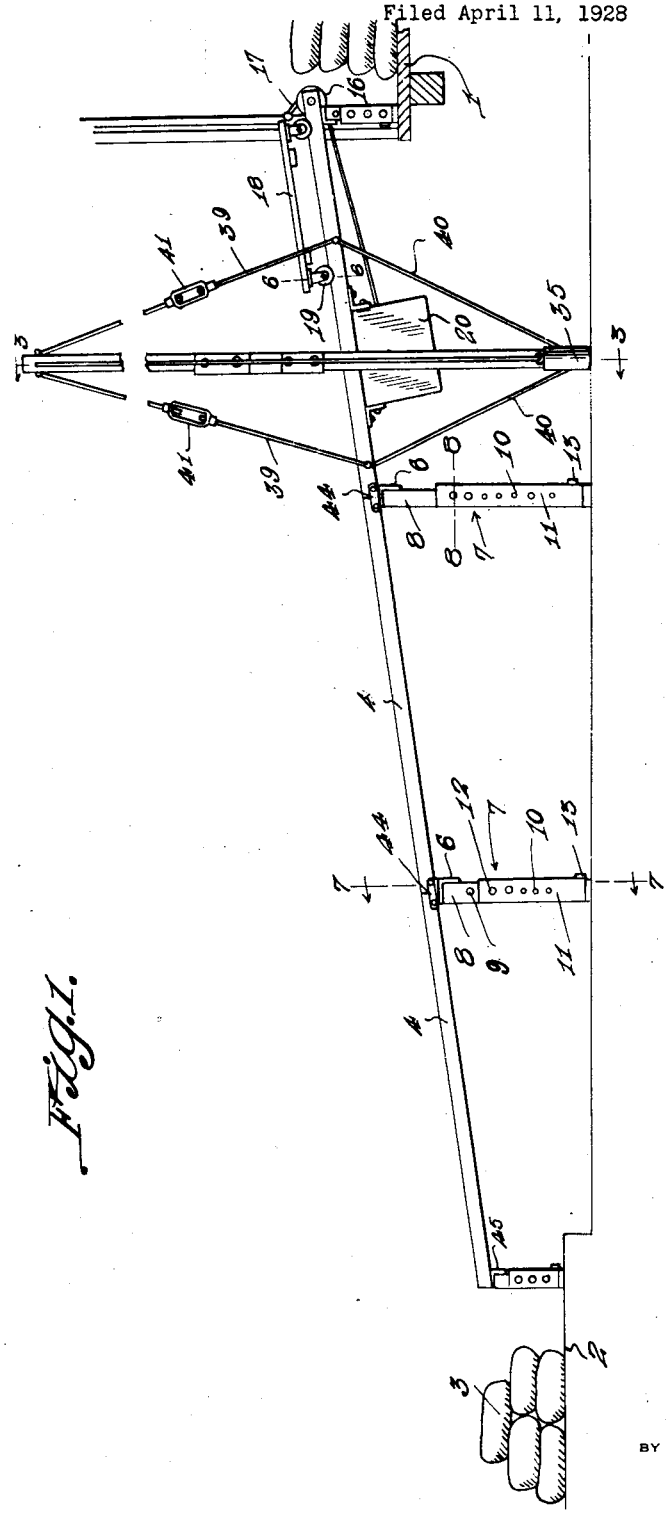
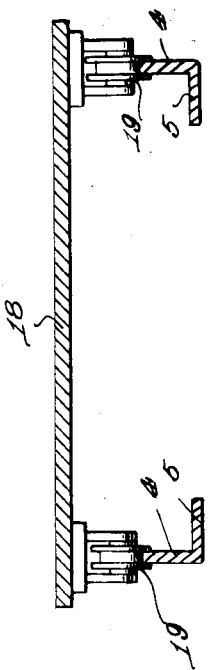
Claude Hosler,
J. B. Whelan,
INVENTOR
BY Victor J. Evans
ATTORNEY Feb. 26, 1929.  1,703,820
C. HOSLER ET AL
UNLOADING CONVEYER
Filed April 11, 1928   3 Sheets-Sheet 2
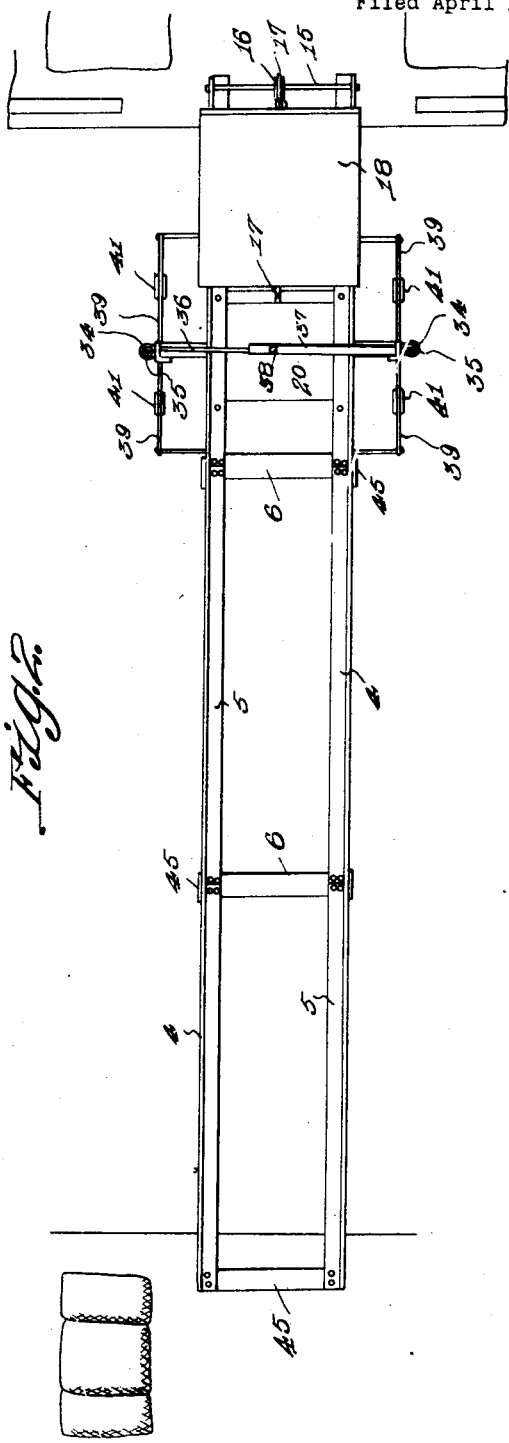
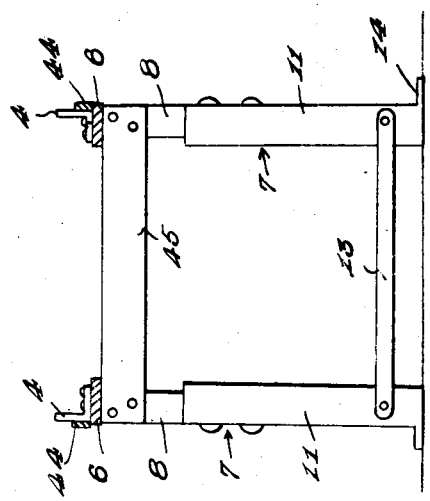
Claude Hosler
J. B. Whelan,
INVENTOR
BY Victor J. Evans
ATTORNEY

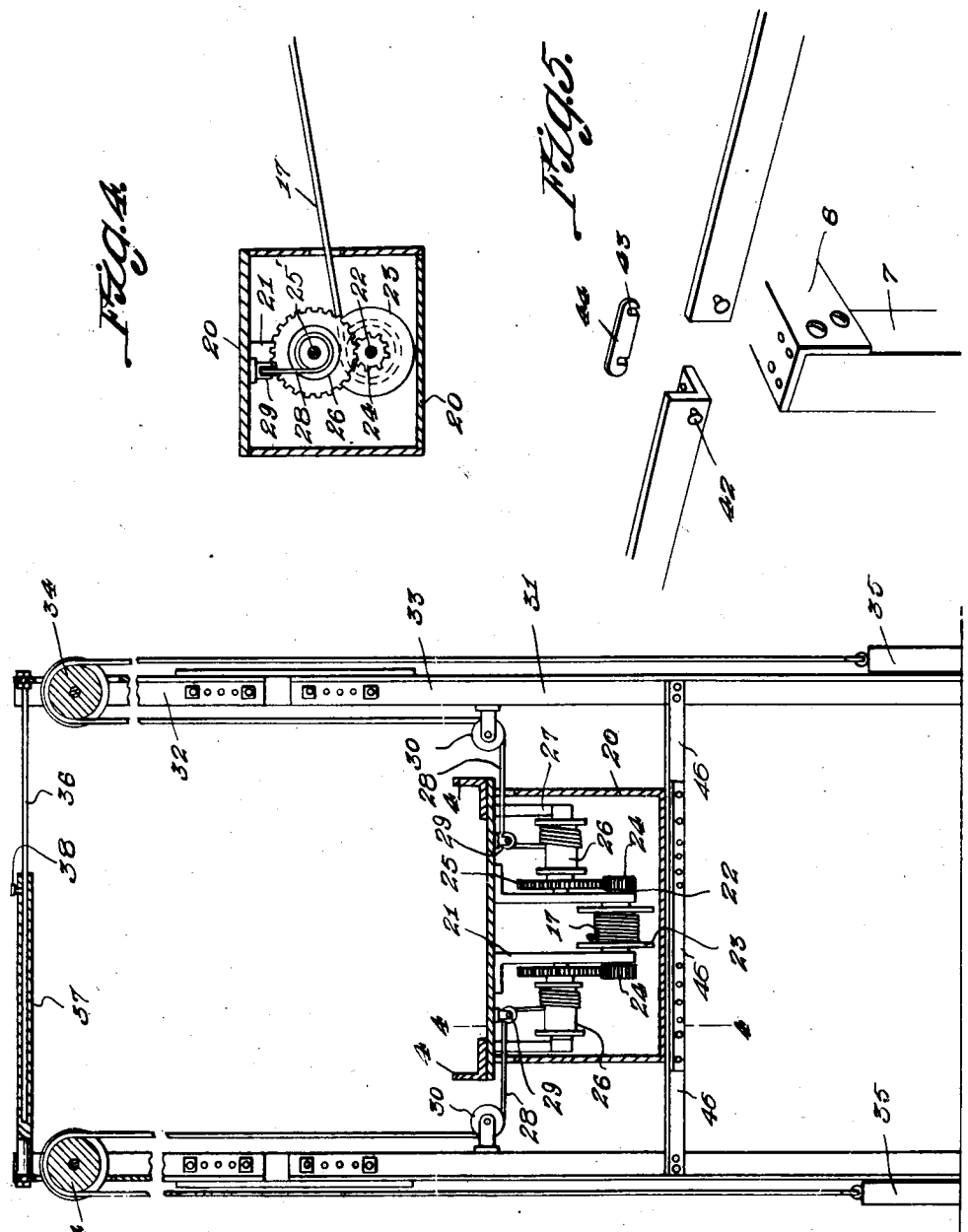

Patented Feb. 26, 1929.

1,703,820

UNITED STATES PATENT OFFICE.

CLAUDE HOSLER AND JOSEPH BARTHOLOMEW WHELAN, OF TOPEKA, KANSAS.

UNLOADING CONVEYER.

Application filed April 11, 1928. Serial No. 269,177.

Our present invention has reference to an unloading conveyer, and is primarily designed for unloading sacks of cement, lime or the like and boxed goods of uniform size and conveying the same from a railway car to a warehouse, the device, of course, being susceptible for use in other connections.

The primary object of the invention is the provision of an unloading conveyer which is gravity influenced and which includes an inclined track arranged between the place at which the goods are received and the place to which the goods are to be conveyed, there being a wheeled pallet or truck traveling on the track and connected by a cable to weight influenced operating means which automatically return the unloaded truck to receiving position, and wherein the weight of the goods deposited upon the truck will cause the same to gravitate over the track to the place of delivery.

A further object is the provision of a means for this purpose in which the track is made up of sections so that the same can be suitably lengthened or shortened, the said track being supported by adjustable means whereby the inclination of the track can be properly determined and arranged, said track having arranged for travel thereon a wheeled truck or pallet to which is connected a cable that is trained around a drum, the turning of which revolves other drums around which cables are also trained, the said cables being trained over suitable sheave wheels which are preferably adjustably supported and have secured on their ends weights, the weight of the articles arranged upon the truck being sufficient to cause the same to travel downwardly on the track from receiving to delivery position, and the weights attached to the cables being such as to return the truck to receiving position when the weight of the articles has been removed therefrom and as a consequence produce a conveyer, automatic in action and which will successfully overcome the laborious task of removing goods from a receiving point to a delivery point.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of the improvement.

Figure 2 is a top plan view thereof.

Figure 3 is a sectional view approximately on the line 3—3 of Figure 1.

Figure 4 is a sectional view approximately on the line 4—4 of Figure 3.

Figure 5 is a perspective view to illustrate the meeting ends of the rails of the track and the support for such rails, together with means for connecting the rail ends.

Figure 6 is a sectional view approximately on the line 6—6 of Figure 1.

Figure 7 is a sectional view approximately on the line 7—7 of Figure 1.

Figure 8 is a detail sectional view approximately on the line 8—8 of Figure 1.

In the showing of the drawings, the numeral 1 designates a portion of a railway car or other structure into which the goods are received and the numeral 2 designates the receiving station for the goods. The station 2 may and preferably is the warehouse in which the goods are to be stored. In Figure 1 of the drawings we have illustrated in both the receiving and delivery points sacked goods 3, the sacks containing cement, lime or the like or as a matter-of-fact any other desired products. It will be apparent as the description progresses that boxed goods of uniform size and as a matter-of-fact any other articles may be conveyed from the station 1 to the station 2 by our improvement.

The improvement contemplates a sectional track which is made up of any desired number of pairs of spaced rails. Preferably, and as disclosed by the drawings, the rails are in the nature of angle irons 4. The horizontal flanges 5 of these rails rest on and are removably secured to the transverse or top connecting members 6 of the track supports 7. The track supports have end posts each including an upper or outer member 8 to which the angle cross members 6 are connected, the members 8 being also preferably in the nature of angle irons. The members 8 are provided with a series of vertically disposed spaced openings 9 designed to aline with a similar series of openings 10 in the outer members 11 of the supports. Removable means, such as pins or bolts 12 pass through certain of the alining openings 10 and 11.

The depending members or legs of the supports are connected by removable cross braces 13, adjacent to their lower ends and if desired the lower portions of the members 11 may be formed of offset flanges in the nature of feet 14 whereby the same will have a better purchase upon the ground surface and upon the floor of the stations 1 and 2. By constructing the track supports of adjustable elements it will be noted that the track may be arranged at a desired inclination between the stations 1 and 2. The elevated end of the track which is received over the floor of the station 1 has passed through the ends of its rails a bar or rod 15 which may be rotatable and which has either secured thereto or journaled thereon a grooved wheel 16. Around this grooved wheel there is trained a cable 17 that is connected to one end of a flat wheeled truck or pallet 18. The wheels 19 of the truck have their sides flanged for contacting with the opposite faces of the rails 4 of the track.

Fixedly secured to the track on the under face thereof adjacent to the end provided with the grooved or sheave wheel 16 there is a box or casing 20. Fixed on the under face of the top of the box-like casing 20 there are spaced depending arms 21, and journaled through openings in these arms there is the shaft 22 for a drum 23 around which the cable 17 is wound, and to which the end of the said cable is fixed. The shaft 22 has fixed on its ends pinions 24 and these pinions are in mesh with gears 25 that are fixed on the shafts 25' for other drums 26, respectively. The shafts 25' for the drums 26 have one of their ends journaled in the hanger arms 21 and their other ends journaled in other hanger arms 27 in the casing 20. The drums 26 have also wound therearound and secured thereto cables 28. These cables are trained over grooved or sheave wheels 29 at the top of the casing and from thence under sheave wheels 30 that have their shafts journaled in suitable brackets 30' secured on the inner faces of uprights 31. The uprights are also preferably in the nature of angle irons and each comprises a pair of adjustably connected sections 32 and 33, respectively. The upper or outer section 32 of each of the uprights 31 has journaled thereon the shaft of a grooved or sheave wheel 34 over which the cables 28 are trained, and the outer ends of the said cables have attached thereto weights 35. The weights are guided along the outer sides of the uprights 31. Adjustable means, in the nature of telescopic members 36 and 37 are secured to the outer or upper ends of the sections 32 of the uprights and binding means 38 hold the telescopic members adjusted to retain the uprights in proper vertical positions.

Suitable angularly disposed and preferably flexible brace elements 39—39 and 40—40 are disposed between the outer sides of the track and the members 32 and 33 constituting the uprights 31. Of course, these elements may be in the nature of rods, or as disclosed by Figure 1 of the drawings, may comprise sections whose ends are connected by turn buckles 41.

The ends of the rails of the track, as stated, rest upon the upper connecting elements 6 of the adjustable legs 7, for the supports, and the confronting ends of these rails have on their outer faces headed studs 42 and these studs are designed to be received in notches 43 in plates 44 to afford the connecting means between the rails. When such connecting means are employed it will not be necessary to bolt or otherwise secure the rails to the supports, and in this instance, the outer rail sections adjacent to their ends may and preferably are provided with depending cleats 45 to contact with the inner or confronting faces of the end supports 7 and thereby hold the truck from sliding on its supports. The weights 35 are sufficient to wind the cables 28 on the drums 26 and through the medium of the intermeshing gears 25 and 24 to turn the drum 23 to wind the cable thereon so as to bring the wheeled platform 18 to its elevated position as disclosed by Figure 1 of the drawings. This will cause the weights to be brought to their lower position as disclosed by Figure 3 of the drawings. When the articles on the station 1 are to be arranged upon the wheeled platform 18 the weight of such articles will overbalance the weights 35, permitting the platform 18 to travel downwardly on the track therefor which, of course, causes the cables 28 to be wound upon the drums 26 and thus the weights 35 will be elevated. When the platform reaches the station 2 and the goods 3 is delivered therefrom the wheeled platform being relieved of weight will, under the influence of the weights 35, be returned to initial position, that is, at the elevated end of the track so that another load may be arranged upon the platform. This operation is continued until all of the goods from the station 1 is delivered onto the station 2.

Suitable stop means may be provided at the ends of the track for limiting the travel of the truck thereover in both directions, or as illustrated by the drawings, the weights may contact with the ground surface when the truck is arranged at the end of the track next to the delivery station and the said weights may contact with the sheave wheels 34 when the truck is at the end of the track next to the receiving station. When only a short track is employed the uprights, which provide the guides for both the cables 28 and the weights will, of course, be shortened. In this case it should be stated that while these upright guides are in the drawings illustrated as comprising only two sections, any desired number of such sections may be employed to accord with the length of travel of the truck on the track.

The casing 20 is also supported on laterally arranged connected plates 46 which have their ends removably secured to the uprights 31.

The simplicity and advantages of the construction will, it is thought, be understood and appreciated by those skilled in the art. In operation it is merely necessary to place the required amount of goods upon the flat body of the truck at the delivery station, sufficient to overcome the influence of the weights 35, when the truck will automatically travel in a downward direction on the track. After the goods have been removed from the truck the weights will exert a downward pull upon the cables 28 to rotate the drums 26 which in turn rotate the drum 23 to cause the cable 17 to be wound therearound and thereby automatically return the truck to its elevated and receiving position.

What we claim as new is:

1. An inclined track designed to be arranged between an elevated delivery station and a lower receiving station, a truck for travel on the track, a cable connected to the truck, trained around the elevated end of the track and likewise trained around a drum, other drums actuated by the turning of the first mentioned drum, cables trained therearound, guide means for the cables and weights on the outer ends of the last mentioned cables.

2. An inclined track designed to be arranged between a delivery station and a receiving station, the rails of the track being made up of removably connected sections, adjustable supports for the track, a truck having grooved wheels for travel on the rails of the track, a cable guided over the elevated end of the track, a drum on which the cable is wound, other drums turned by the turning of the first mentioned drum, cables on the last mentioned drum, elevated guide means for the said cables and a weight fixed on each of said cables.

3. An unloading conveyer comprising a track designed to be arranged at an inclination between a delivery station and a receiving station, the rails of said track comprising angle irons and being made up of sections, removable means for connecting the rail sections, adjustable supports on which the track rests, a sheave wheel at the elevated end of the track, a truck having grooved rollers for travel on the rails of the track, a cable on the truck trained around the sheave wheel, a casing supported under the track adjacent the elevated end thereof, a drum in the casing around which the cable is wound, and said drum having a shaft extending beyond the ends thereof and journaled in bearings, pinions on the ends of the shaft, other drums having shafts journaled in bearings in the casing, gears fixed on said shafts and meshing with the pinions, a cable trained around each of said last mentioned drums, elevated guide means for each of said cables, and a weight fixed on the free end of each of said cables.

4. An unloading conveyer, comprising a track arranged at an inclination between a delivery station and a receiving station, the rails of the track being made up of sections, headed lugs on the rail ends, notched plates receiving the lugs in the notches thereof, supports for the track, each of which comprising a transverse member on which the rails of the track rest and depending leg members, and said leg members being made up of adjustably connected sections, a sheave wheel at the elevated end of the track, a truck having grooved wheels for travel on the rails of the track, a cable secured to the truck and trained around the sheave wheel, a casing supported by and arranged below the track, a drum in the casing and around which the cable is wound, a shaft journaled in bearings in the casing for the drum, pinions on the ends of the shaft, other pinions having shafts journaled in the casing, a drum fixed on each of said shafts, a gear on each of said shafts in mesh with the pinions, a cable wound around and secured to each of the last mentioned drums, guide means for directing the cable through the sides of the casing, uprights comprising adjustably associated sections, and the lower sections of the uprights being removably fixed to the casing, upper and lower sheave wheels on the uprights providing guides for the last mentioned cables, weights fixed on the outer ends of the said cables and guided along the outer sides of the uprights, and removable and adjustable means connecting the uprights.

In testimony whereof we affix our signature.

JOSEPH BARTHOLOMEW WHELAN.
CLAUDE HOSLER.